United States Patent [19]

Hejazi et al.

[11] Patent Number: 5,605,429
[45] Date of Patent: Feb. 25, 1997

[54] DOOR SAFETY SYSTEM FOR STORAGE PHOSPHOR CASSETTE AUTOLOADER

[75] Inventors: Shahram Hejazi, Webster; Gary W. Shope, Rochester; Jeffrey J. Yaskow, Williamson; Carl A. Swanson, Penfield; Michael J. Epner, Rochester, all of N.Y.

[73] Assignee: Eastman Kodak Company, Rochester, N.Y.

[21] Appl. No.: 555,312

[22] Filed: Nov. 8, 1995

Related U.S. Application Data

[63] Continuation of Ser. No. 86,445, Jun. 30, 1993, abandoned.

[51] Int. Cl.$^6$ .............................. B65G 1/00; E05F 15/02
[52] U.S. Cl. ................................ 414/331; 49/27; 49/28; 414/251; 414/564; 187/317
[58] Field of Search ............................ 414/331, 564, 414/567, 251; 49/27, 28; 187/317

[56] References Cited

U.S. PATENT DOCUMENTS

| | | | |
|---|---|---|---|
| 1,782,084 | 11/1930 | Wright et al. | |
| 1,909,045 | 5/1933 | Currie | 414/251 |
| 2,370,785 | 2/1944 | Fitzgerald | 242/22 |
| 2,446,344 | 8/1948 | Smith | 414/251 |
| 2,508,460 | 5/1950 | Latham et al. | 146/7 |
| 2,618,282 | 11/1952 | Stanitz et al. | 134/58 |
| 2,734,281 | 3/1953 | Kauffman, II | 34/87 |
| 3,028,870 | 4/1962 | Fay | 134/58 |
| 3,030,842 | 4/1962 | Goltermann | 83/564 |
| 3,492,589 | 1/1970 | Rotier | 328/146 |
| 3,537,211 | 11/1970 | Guilbert, Jr. et al. | 187/317 |
| 3,646,354 | 2/1972 | Von Brimer | 307/10 BP |
| 3,691,684 | 9/1972 | Boneck | 49/21 |
| 3,746,938 | 7/1973 | Lamb | 317/136 |
| 3,753,259 | 8/1973 | Donovan | 340/228 R |
| 3,801,860 | 4/1974 | King | 315/136 |
| 3,805,658 | 4/1974 | Scott et al. | 83/545 |
| 3,830,018 | 8/1974 | Arai et al. | 49/28 |
| 3,855,733 | 12/1974 | Miller | 49/488 |
| 3,902,773 | 9/1975 | Gondek | 414/251 |
| 3,903,908 | 9/1975 | Logue et al. | 414/564 |
| 3,915,273 | 10/1975 | Loschengruber | 192/135 |
| 4,024,521 | 5/1977 | Salk | 340/253 B |
| 4,063,148 | 12/1977 | Fehlmann et al. | 323/43.5 |
| 4,106,607 | 8/1978 | Badavas | 192/129 B |
| 4,143,367 | 3/1979 | Schestag | 340/540 |
| 4,226,322 | 10/1980 | Peris | 192/135 |
| 4,228,884 | 10/1980 | Michels | 192/135 |
| 4,238,696 | 12/1980 | Smart | 307/360 |
| 4,263,536 | 4/1981 | Lee et al. | 318/266 |
| 4,328,540 | 5/1982 | Matsuoka et al. | 364/167 |
| 4,351,016 | 9/1982 | Felbinger | 361/181 |
| 4,365,188 | 12/1982 | Walter | 318/282 |
| 4,383,206 | 5/1983 | Matsuoka et al. | 318/445 |
| 4,414,539 | 11/1983 | Armer | 340/500 |
| 4,439,805 | 3/1984 | Tarleton | 361/92 |
| 4,649,286 | 3/1987 | Takeda et al. | 307/10 R |
| 4,687,088 | 8/1987 | Babel | 192/133 |
| 4,736,145 | 4/1988 | Sakurai et al. | 318/563 |
| 4,753,323 | 6/1988 | Kähkipuro | 187/317 |
| 4,764,835 | 8/1988 | Bowman | 361/1 |
| 4,890,183 | 12/1989 | Champiau | 361/86 |
| 4,911,597 | 3/1990 | Maydan et al. | 414/331 |
| 5,027,552 | 7/1991 | Miller et al. | 49/27 |
| 5,051,672 | 9/1991 | Yaguchi | 318/469 |
| 5,080,343 | 1/1992 | Kushimal et al. | 414/331 |
| 5,147,268 | 9/1992 | Cermeno | 493/38 |
| 5,157,504 | 10/1992 | Shiraishi et al. | 414/331 |
| 5,159,203 | 10/1992 | Gallenschutz et al. | 307/116 |
| 5,166,586 | 11/1992 | Yaguchi | 318/434 |
| 5,191,268 | 3/1993 | Duhame | 318/266 |

Primary Examiner—David A. Bucci
Assistant Examiner—R. B. Johnson
Attorney, Agent, or Firm—William F. Noval

[57] ABSTRACT

In an apparatus for storing and automatically delivering cassette and/or pallets containing cassettes to a reader. The apparatus includes a plurality of cassette retaining sites. A door assembly is provided adjacent the portal for allowing access to the plurality of cassette retaining sites. The door assembly has at least one door slideably mounted to the apparatus for movement between a closed position and an open position. A door safety system is provided.

5 Claims, 11 Drawing Sheets

DOOR SAFETY SYSTEM FOR STORAGE PHOSPHOR CASSETTE AUTOLOADER

This is a Continuation of application Ser. No. U.S. 08/086,445, filed 30 Jun. 1993, now abandoned.

FIELD OF THE INVENTION

The present invention relates, in general, to equipment used in processing storage phosphors, and more particularly relates to a door assembly for an autoloader for feeding cassettes and/or pallets containing cassettes to and receiving them from a storage phosphor reader.

It is convenient to handle a storage phosphor within cassettes that protect the storage phosphor from extraneous light and damage. This is particularly the case for storage phosphors in which the latent x-ray image stored in the storage phosphor is read by photoelectrically detecting an emitted x-ray image formed by scanning with stimulating radiation. An example of such a storage phosphor reader is disclosed in U.S. Pat. No. 5,323,018, issued Jun. 21, 1994, inventors Rogers and Dhurjaty. It is desirable to retain the storage phosphor within a cassette except during actual processing. Such a cassette is disclosed in U.S. Pat. No. 5,276,333, issued Jan. 4, 1994, entitled "X-ray Cassette Having Removable Photographic Element" by Jeffrey C. Robertson, which is incorporated herein by reference. A hook extractor can be used with the storage phosphor cassette to move a storage phosphor plate to and from a storage phosphor reader for processing. It is desirable to provide an apparatus to automate the presentation of such cassettes to the extractor so that a number of cassettes could be processed in succession without attention from an operator. It is also desirable that such an apparatus be able to accurately position cassettes and/or pallets containing cassettes sequentially to simplify removal and reinsertion of the storage phosphor and that the presentation apparatus be separate from the storage phosphor reader to permit interchange of units and reduce repair time.

An example of a suitable device for presenting cassettes is disclosed in copending application U.S. Pat. No. 5,278,410, issued Jan. 11, 1994, entitled "X-ray Cassette Positioner" of John C. Boutet et al which is also hereby incorporated by reference. In this reference there is disclosed an autoloader for use with a plurality of cassettes and/or pallets containing cassettes which comprise first and second cog belts spaced apart so as to provide a plurality of cassette retaining sites one of which defines a cassette read site for presenting of the cassette to the reader. Access to the loading and unloading sites is obtained through a portal in the cabinet enclosing the mechanism. An access door is provided for allowing access within the cabinet through the portal. The belts are driven such that the cassettes are each individually positioned at the read site for removal of the storage phosphor therein for reading by the reader after which it is returned to the cassette. The autoloader allows a plurality of individual cassettes to be stored for automatic supplying to the reader thus freeing the operator to accomplish other duties.

In a storage phosphor reader/storage phosphor cassette autoloader system, it is desirable that the door which allows access to the loading and unloading sites of the autoloader operate in a smooth manner. It is also desirable that a door safety system have the following features: (1) all power to the autoloader motors be cut off when any of the control voltages have been cut off; (2) all unnecessary autoloader motors be disabled while the door is open; (3) in case of an obstruction while the doors are being closed, provide a sensor control to override any control command and open the doors all the way, then give the control of the doors back to the control; (4) in case of any damage to the electrical connectors and cables to the door obstruction sensor control, open the doors all the way and keep them open until the problem is solved.

There is thus a problem in a storage phosphor reader/storage phosphor cassette autoloader system in providing an autoloader door safety system that is reliable, inexpensive, maintenance free, simple and which incorporates the aforesaid desirable features.

SUMMARY OF THE INVENTION

According to the present invention, there is provided a solution to such a problem of the prior art.

According to an aspect of the present invention, there is provided a storage phosphor cassette autoloader comprising:

first and second endless conveyor belts, said conveyor belts being spaced apart and having a plurality of outwardly extending shelves in vertical alignment so as to define a cassette read site and a plurality of cassette retaining sites;

a conveyor belt drive for driving said conveyor belts in unison to transfer cassettes loaded in said retaining sites serially through said read site;

a body encasing said conveyors and having a portal adjoining said cassette retaining sites for allowing cassettes to be placed on or removed from said shelves of said conveyor belts;

at least one door, which is placed adjacent to said portal for allowing access through said portal, and which is movably mounted on said autoloader for movement between a closed position and an open position;

a door drive for moving said door between the open and closed positions;

a force sensitive assembly mounted on the leading edge of said door for sensing if said door is obstructed while it is being closed;

a source of electrical power for supplying power to said conveyor belt drive and said door drive; and a control for controlling said autoloader to (a) cut off all power from said source of power to said conveyor belt drive and said door drive if there is an interruption of power; (b) disable the conveyor belt drive while said door is in the open position; and/or (c) if said force sensitive assembly senses an obstruction while said door is being closed, control said door drive to move said door to said open position.

BRIEF DESCRIPTION OF THE DRAWINGS

In the detailed description of the preferred embodiment of the invention presented below reference is made to the accompanied drawing, in which.

DESCRIPTION OF A SPECIFIC EMBODIMENT

Figure 1:
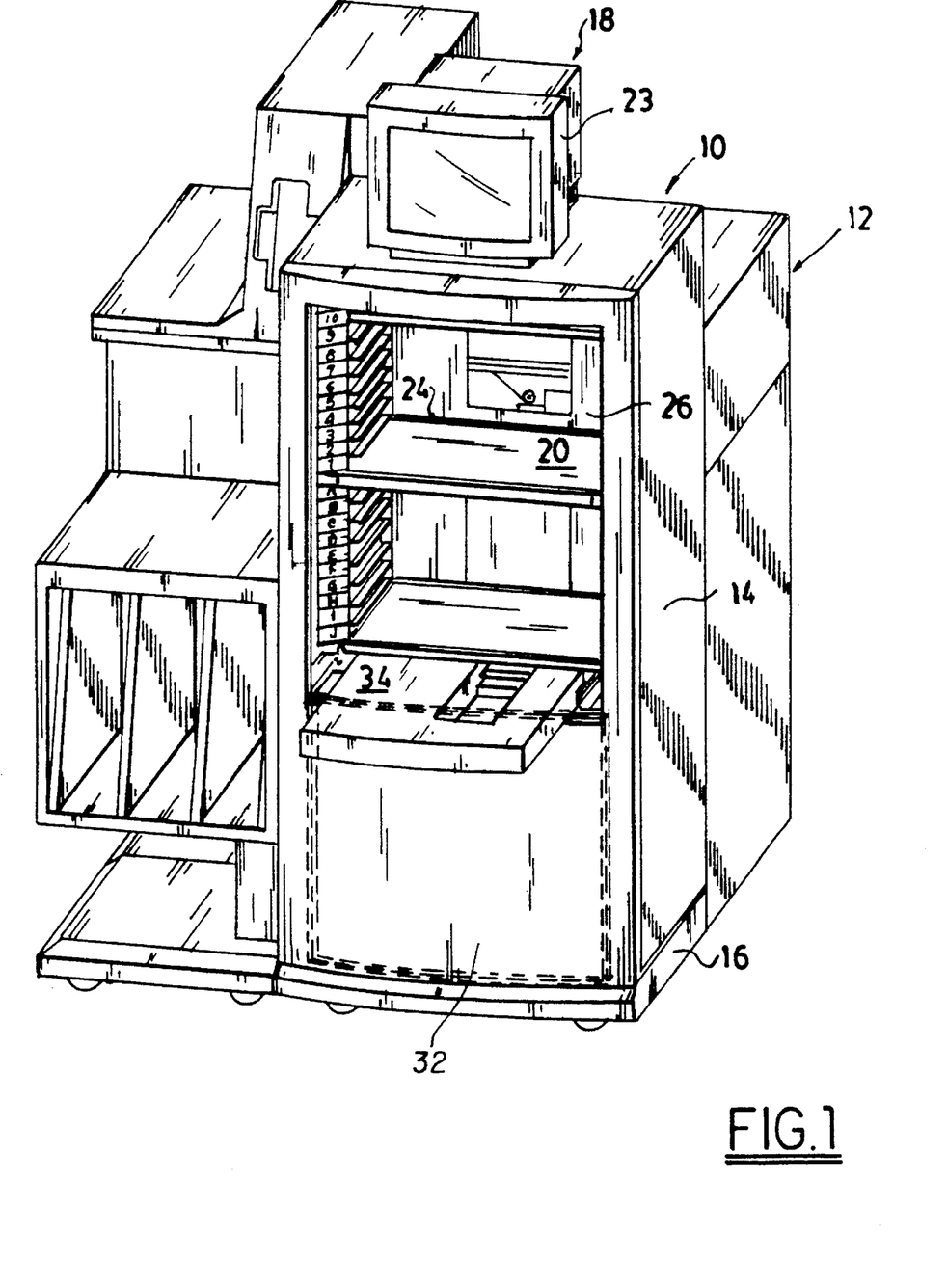
FIG. 1 is a front perspective view of a cassette autoloader along with a storage phosphor reader and monitor illustrating the door assembly in the open position and the retractable shelf in the extended position.
Figure 2:
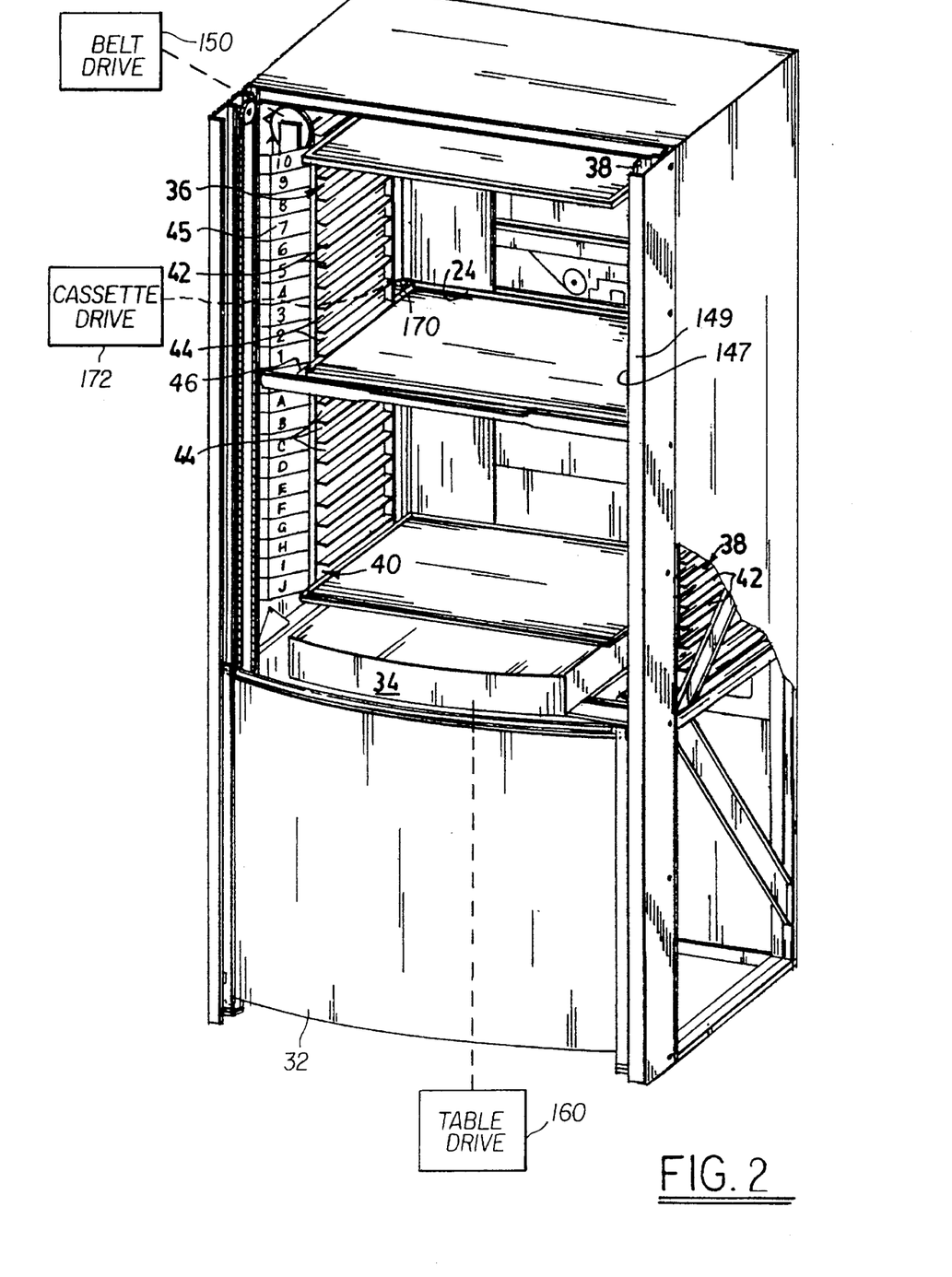
FIG. 2 is perspective view of the autoloader of FIG. 1 with the body partially broken away and the door in the opened position with the shelf in the retracted position.

Referring to FIGS. 1 and 2 there is illustrated an autoloader 10 incorporating an embodiment of the present invention positioned directly in front of a storage phosphor reader 12. Storage phosphor reader 12 can be that described in U.S. Pat. No. 5,323,018, issued Jun. 21, 1994 referred to above. The autoloader has a body 14 with a base 16 at the bottom and a monitor station 18 on top. The body 14 can be made of sheet metal or the like reinforced as necessary to support loads imposed by the autoloader components and storage phosphor cassettes 20 or pallets containing cassettes. The cassette is of the type wherein the storage phosphor is removed through one of the sides of the cassette such as that described in U.S. Pat. No. 5,276,33, issued Jan. 4, 1994, previously referred to herein. Briefly, the cassette comprises a shell having upper and lower panels and three side caps joining the upper and lower panels, and a removable end cap. A storage phosphor plate is provided within the cassette and is secured to the removable end cap. The end cap includes a latching mechanism for releasing the end cap from the cassette. A latch bar having at least one hook is used to latch or unlatch the latching mechanism. It is to be understood that other cassette construction may be used as appropriate, such as that disclosed in U.S. Pat. Nos. 5,065,866 and 5,090,567. Additionally, an example of a suitable pallet for use in the autoloader 10 is described in U.S. Pat. No. 5,277,322, issued Jan. 11, 1994, entitled "Pallet for Holding a Cassette", inventors John Boutet, James F. Owen, Wayne Arseneault, Jeff Yaskow, and Thomas Dale Baker which is hereby incorporated by reference. Monitor station (18) may include some means for preventing inadvertent movement of the monitor 23, such as indentations. At the rear, body 14 has an access opening 24, as best seen by reference to FIG. 2, through which the forward end of a cassette is passed so that the forward end of the cassette 20 is placed within the adjacent storage phosphor reader 12. At the front, body 14 has a portal 26 which is generally rectangular in shape and provides access to the interior of body 14. Facing portal 26 is an operator station, which may be occupied by an operator.

Figure 3:
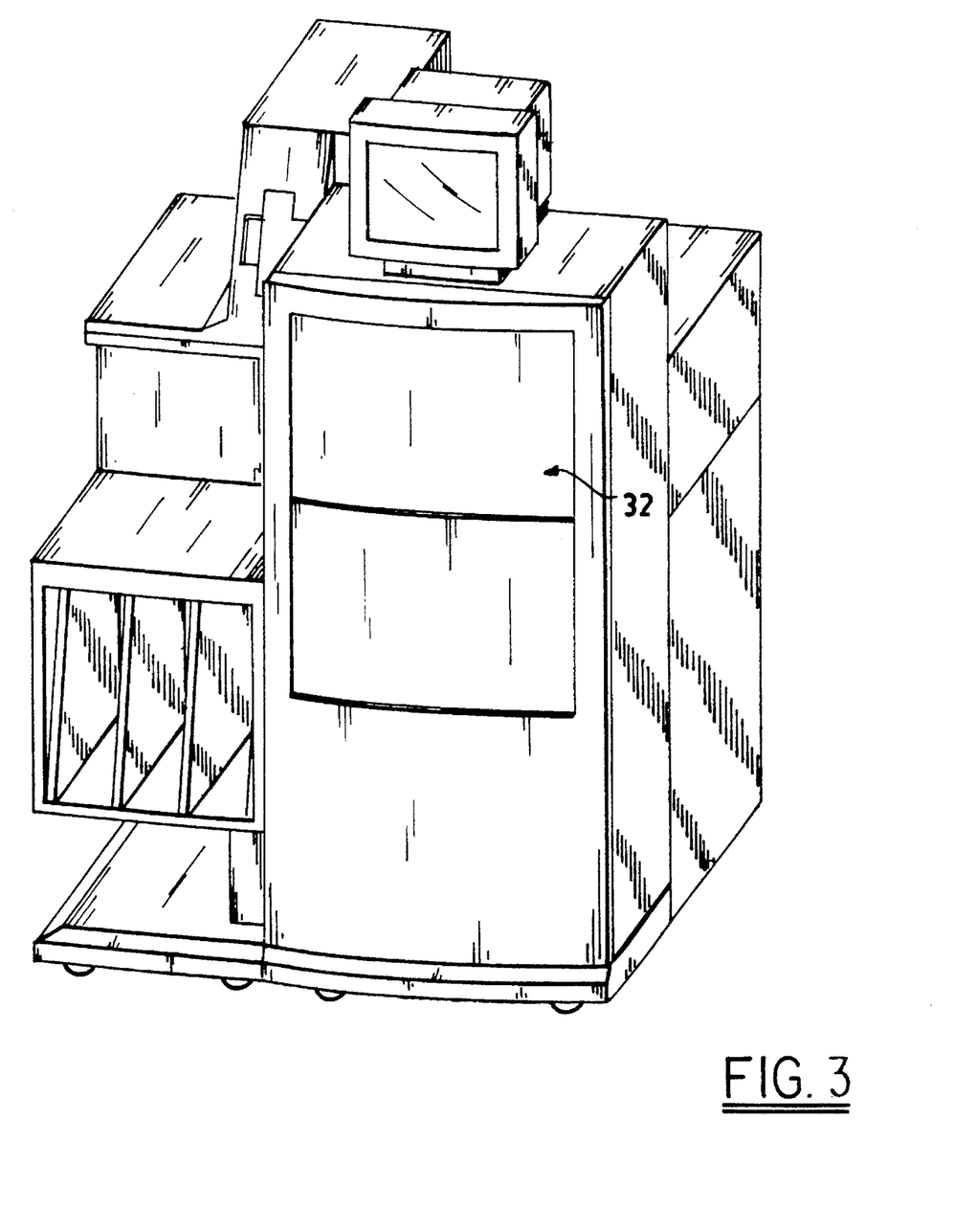
FIG. 3 is a view similar to FIG. 1 illustrating the retractable shelf in the retracted position and the door assembly in the closed position.
Figure 4:
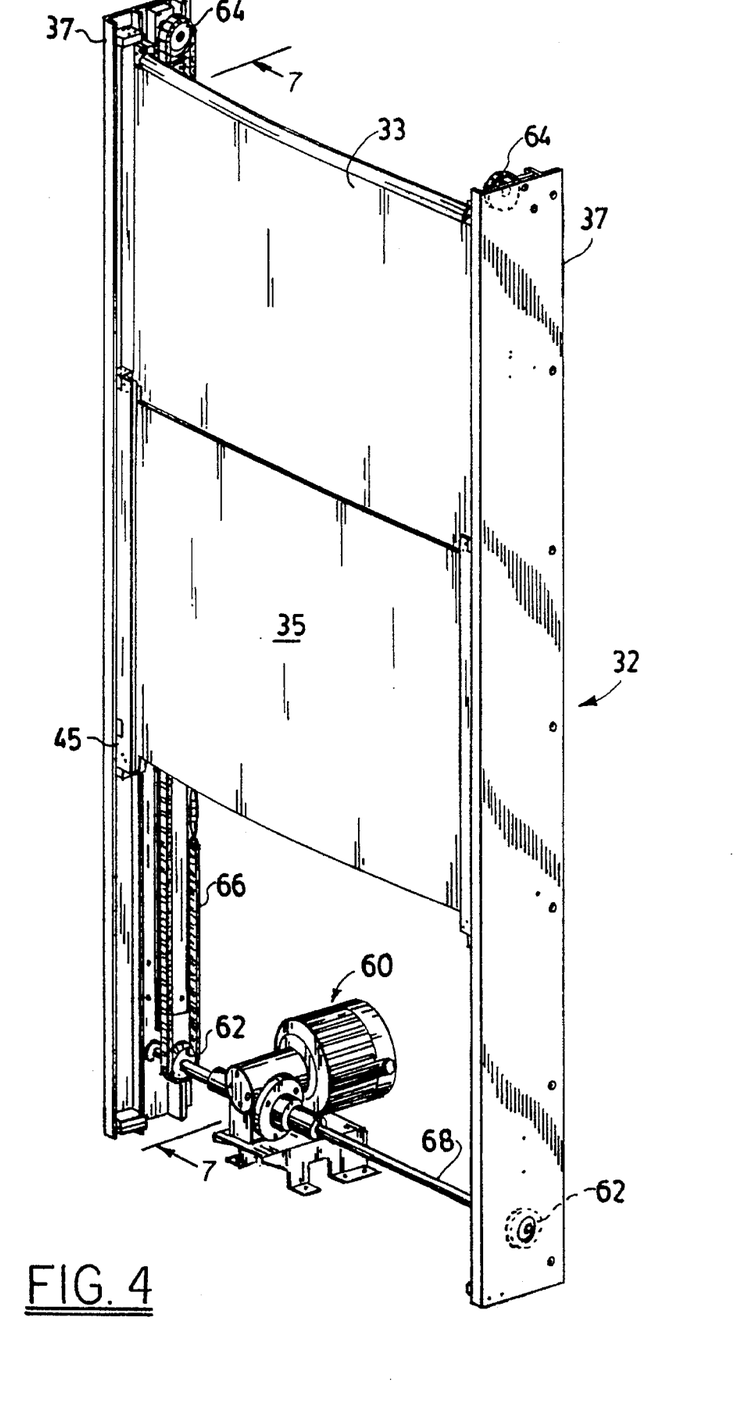
FIG. 4 is a perspective view of the door assembly used in the positioner of FIGS. 1 and 3 illustrating the door assembly in the closed position.
Figure 5:
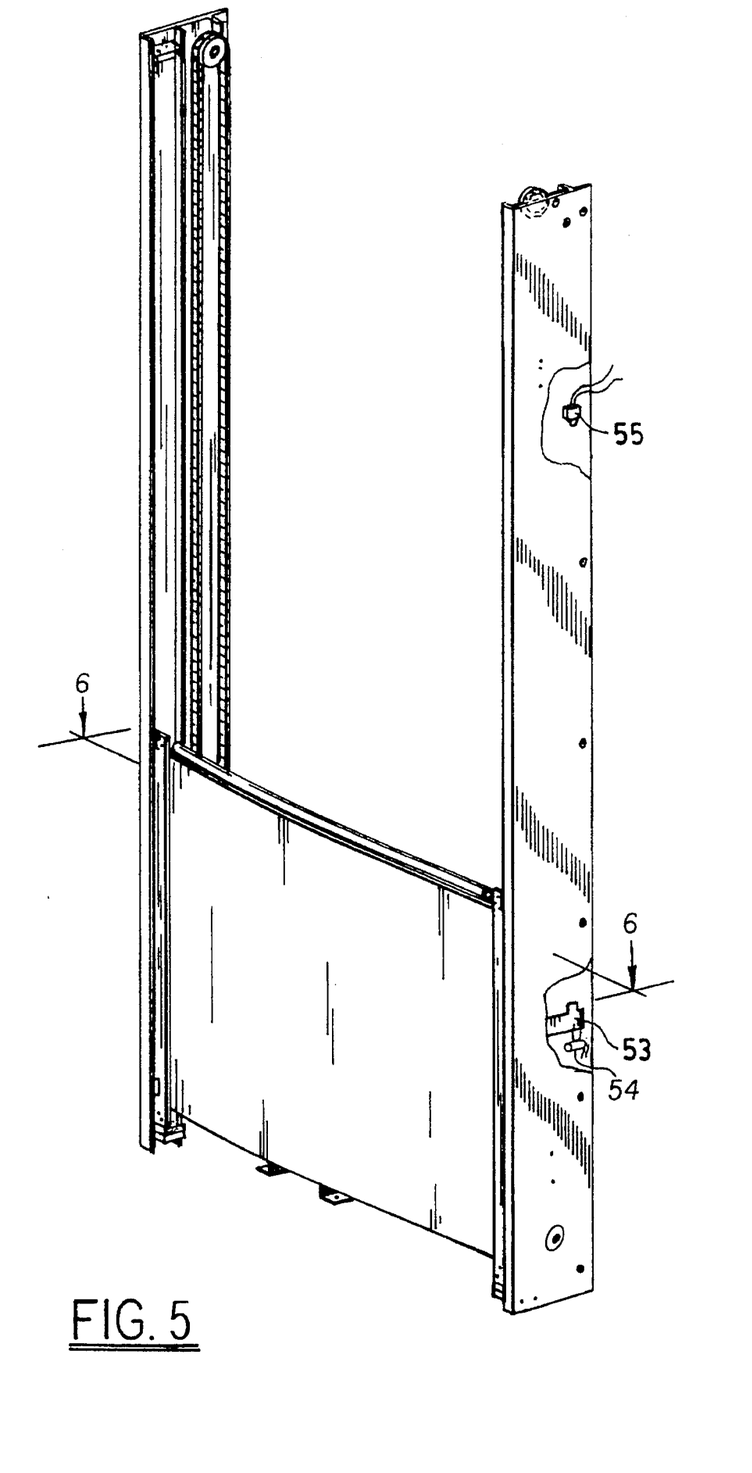
FIG. 5 is a view similar to FIG. 4 illustrating the door assembly in the open position.
Figure 6:
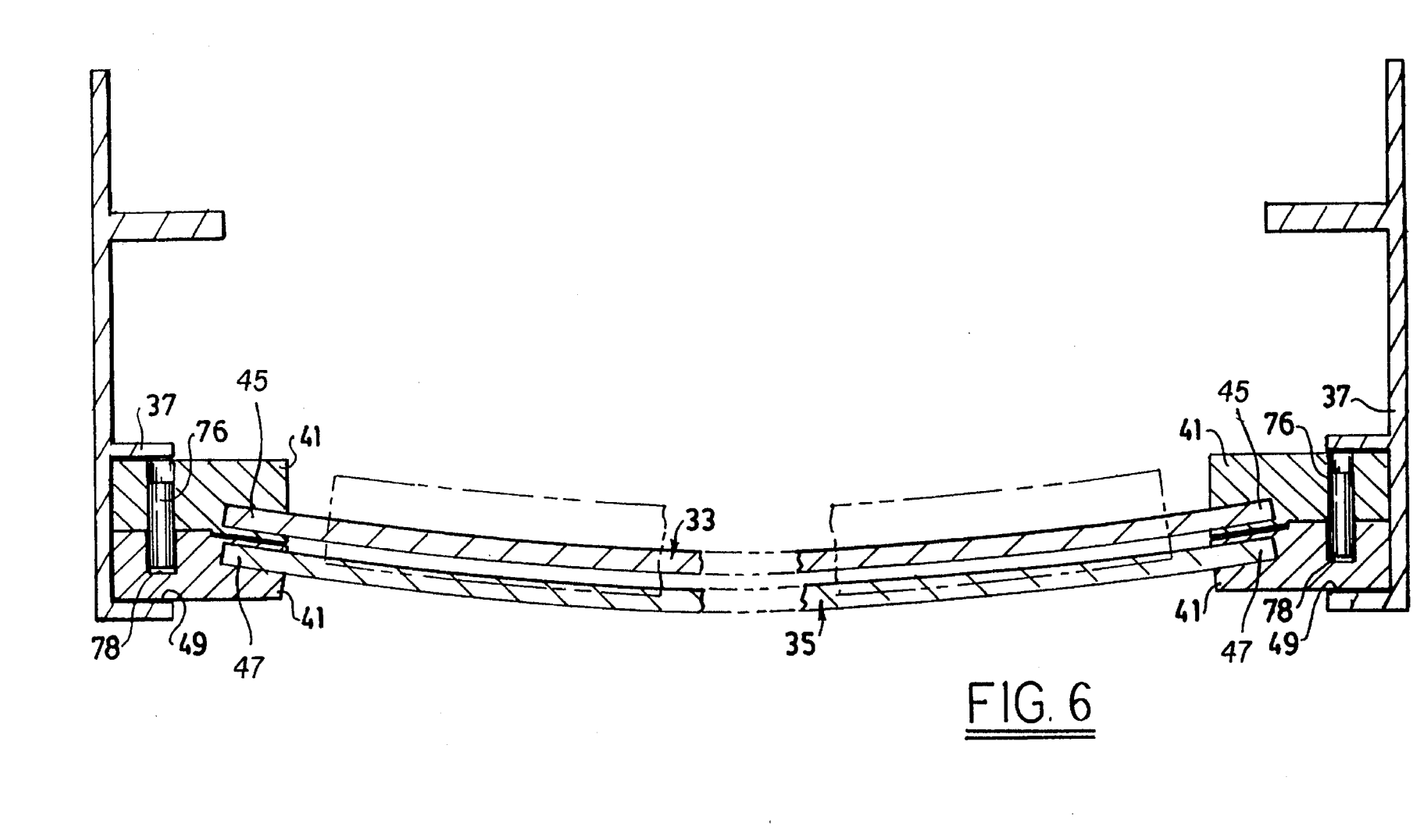
FIG. 6 is a cross-sectional view of the door assembly of FIG. 5 as taken along line 6–6.

A door assembly 32 is provided adjacent portal 26 of body 14 which is operable between a closed position, as shown in FIG. 3, in which the portal 26 is closed and an open position, as shown in FIG. 1 in which the interior of body 14 is accessible through portal 26. The door assembly 32 includes a pair of panels 33,35 slideably mounted to a pair of slide members 37 which are secured to frame 39. In the particular embodiment illustrated, the panels 33,35 (see FIGS. 5 and 6) each have a slide block 41 secured at each of the lateral edges 45,47 of panels 33,35, respectively. The slide blocks 41 slide within a single channel 49 provided in each of the slide members 37. A guide member 51 is provided at the top of panel 33 and at the bottom of panel 35 so as to maintain each of the panels 33,35 in position in channel 49. Slide blocks 41 and slide members 37 are made of a material which allows easy sliding therebetween. In the particular embodiment illustrated, the slide members 37 are made of polytetrafluoroethylene (Teflon™) and the slide blocks 41 are made of a aluminum and have an outer coating of polytetrafluoroethylene. However, the slide member 37 and slide blocks 41 may be made of any suitable material that allows sliding with the associated slide member. Means are also provided for identifying when the door assembly is in the closed position. In the embodiment illustrated in FIG. 5, a member 53 is secured to panel 33 which engages a switch 55 secured to the frame or slides when the door panel 33 is in the closed position and switch 54 when the door panel 33 is in the open position.

Referring to FIG. 2, the autoloader 10 is provided with a first and second conveyor assemblies 36,38, respectively. Each conveyor assembly 36,38 is provided with an endless cog belt 40, each cog belt 40 having a plurality of regular spaced shelves 42. The cog belts 40 are aligned and driven b belt drive 150 such that the shelves 42 provide a plurality of vertically arranged cassette retaining sites 44 between shelves 42 within body 14. In line with the center of access opening 24 there is provided a read site 46 whereby the cassette when placed in such position can be advanced for reading into the adjacent x-ray reader 12. The cassette sites 44 above reading site 46 are loading sites wherein cassettes which have yet to be read are placed. In the particular embodiment illustrated these loading sites are identified by numerals, one through ten, placed on side panels 45,47. The cassette sites 44 below read site 46 are unloading sites and are preferably identified by different indicia from that of loading sites. In the particular embodiment illustrated, the unloading sites are identified by letters and in particular, by the letters A–J. Cassettes 20 can be interchanged between loading sites easily since each cassette is supported by a pair of vertically aligned shelves 42 and cassettes 20 are spaced apart from each other by a distance sufficient to permit each individual cassette 20 to be gripped while positioned fully to the back of every cassette site 44. While only one read site is provided, any number of loading and unloading sites may be provided as desired. In the particular embodiment illustrated, there is provided ten loading sites and ten unloading sites. To prevent accidental placement or attempted removal of a cassette from read site 46, a cross bar 49 is secured to body 14 in front of read site 46.

A cassette advancing and retracting assembly includes roller(s) 170 driven by cassette drive 172. Rollers 170 engage the sides of cassette 20 and are rotated in one direction to advance a cassette 20 through access opening 24 into storage phosphor reader 12. Rollers 170 are rotated in the opposite direction to retract a cassette 20 into autoloader 10. The operation of rollers 170 in advancing and retracting a cassette is described more fully in the aforementioned U.S. patent application Ser. No. 902,214, the contents of which are incorporated herein by reference.

The cog belts 40 are driven in unison by a drive 150 (FIG. 2). An example of a drive used to drive cog belts 40 is more fully described in copending application U.S. Ser. No. 902,214, previously referred to herein. Such drive delivers cassettes seriatim to the read site, at which a storage phosphor is removed from the cassette, delivered to the reader 12, removed from the reader and placed back in the cassette and then delivers the cassettes to unloading sites.

A drive is provided for automatically moving the door panels 33,35 between the open position as illustrated in FIG. 1 and the closed position as illustrated in FIG. 3. In particular there is provided a an electric motor 60 connected to an appropriate source of power. A pair of gears 62,64 are provided on each slide member 37, gear 64 being located near the top of the slide member 37 and gear 62 being located near the bottom of the slide member 37. A drive chain 66 is provided between each pair of gears 62,64 and forming a closed loop about which the chain 66 moves. The motor 60 is coupled to the bottom gears 62 by drive shaft 68 so as to cause the bottom gears 62 to rotate in either direction and thus drive the chain 66 in the desired direction about the closed loop.

Figure 7:
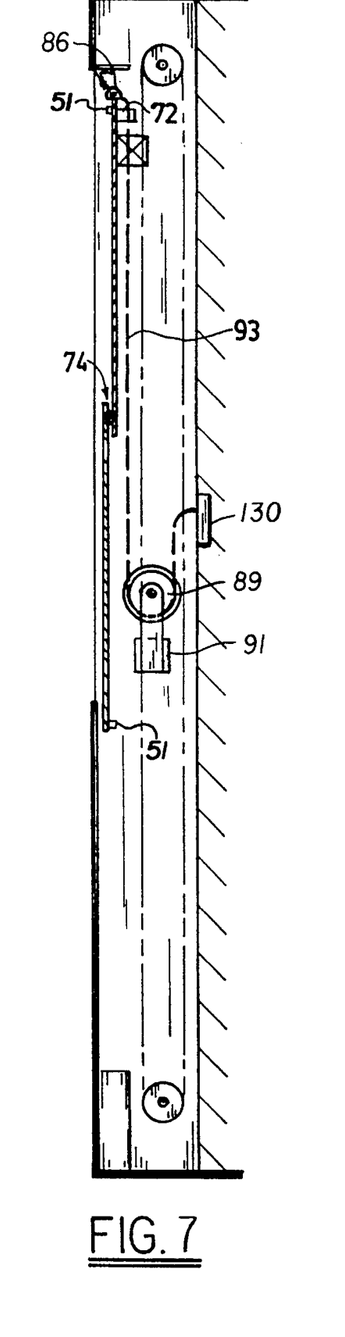
FIG. 7 is a side cross-section views of the door assembly of FIG. 4 as taken along line 7–7 of the door assembly in the closed position.
Figure 8:
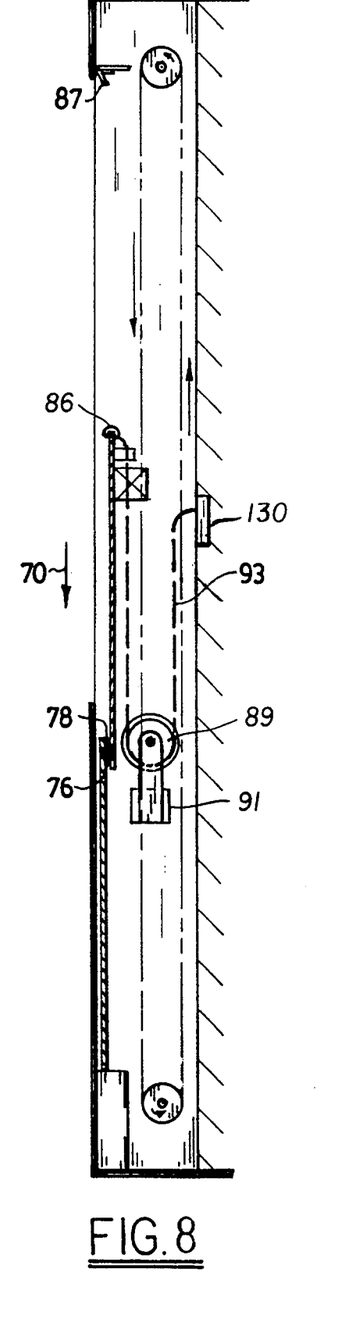
FIG. 8 and 9 are cross-sectional views similar to FIG. 7 illustrating the door panels as they move to the open position.
Figure 9:
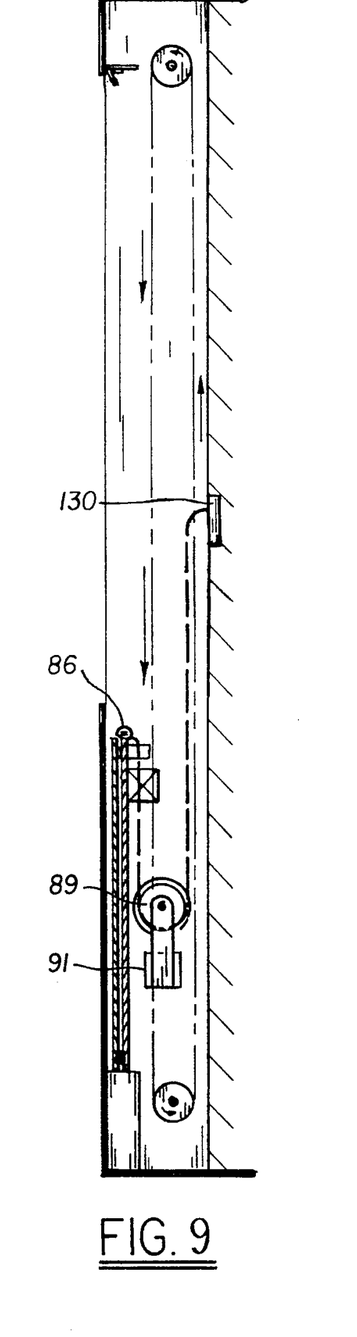

The top panel 33 is secured to chains 66 at an appropriate point so that the chains 66 can be moved in the direction indicated by arrow 70 in FIG. 8, from the closed position illustrated in FIG. 7 to the open position illustrated in FIG. 9. The top panel 33 may be secured to drive chain 66 by any appropriate means. In the particular embodiment illustrated, chains 66 are secured to a drive block 72 placed at each of the top corners of the panel 33. As can be seen by reference to FIGS. 7–9, only the top panel 33 is connected to chains 66. The bottom panel 35 is driven upward by the connection it makes with top panel 33. The bottom portion 74 of the slide blocks 41 of top panel 33 are provided with a projection 76 which engages a slot 78 in the adjacent slide block provided on the top portion 80 of bottom panel 35 (see FIG. 6). Preferably, the pin is made of an acetyl resin, such as Delrin™, made by DuPont; Thus the bottom panel 35 will remain in the bottom position as illustrated in FIG. 9 until the projection 76 engages the top of slot 78 as illustrated in FIG. 8. As the top panel 33 is continued to be driven upward as illustrated in FIG. 7, the bottom panel 35 will be driven up by the top panel 33.

Figure 10:
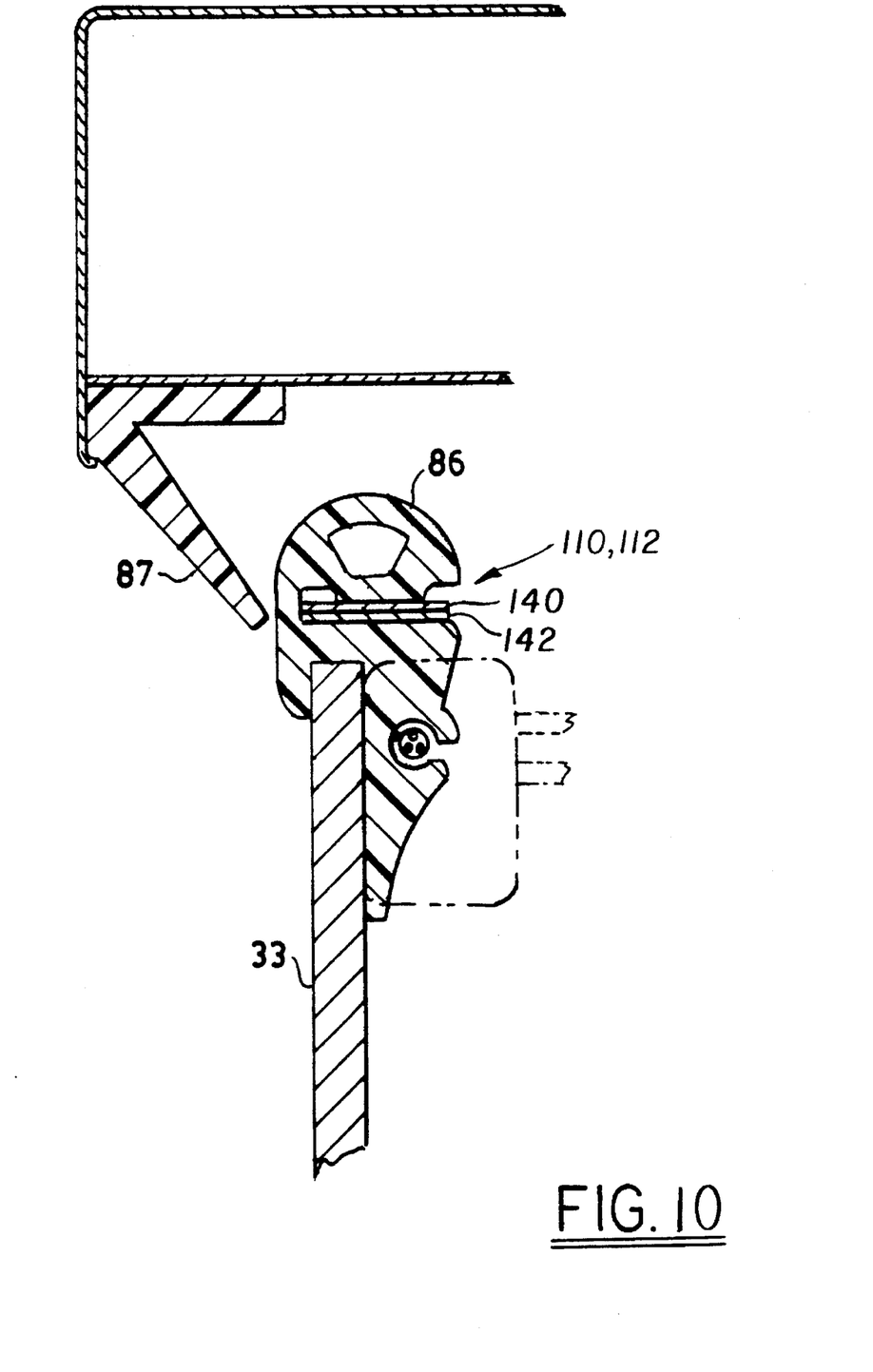
FIG. 10 is an enlarged perspective view of a portion of the top panel of the door assembly illustrating a force sensitive assembly for sensing if an obstruction is in the path of the door.

Referring to FIG. 10, there is illustrated a partial perspective view of the top portion 84 of the top panel 33. The top portion is provided with an elastomeric extrusion 86. The extrusion 86 has a cross-sectional configuration and made of a material that cushions the impact of the door against any object or obstruction that may be in the way of the door travel as it closes. The panel 33 is shown in the closed position. As can be seen, the extrusion does not contact the body of the autoloader. The top of portal 26 is provided with an elastomeric trim piece 87 designed to extend in front of extrusion 86 and slightly below the top surface. The trim piece 87 is made of a material similar to extrusion 86. Therefore, if an object is caught between extrusion 86 and trim piece 87, these parts will deflect so as to minimize or avoid damage or injury to the obstruction.

A pinch safety circuit is provided for determining if an obstruction is present in the path of top panel 33 that would stop the door panel from any further travel. In the embodiment illustrated in FIG. 10, there is provided a pair of side-by-side Force Sensitive Resistor sensors 110,112 designed to produce a signal in the event that an object (such as an operator's hand) is pressed against the top of panel 33. AS will be described in more detail below, if a signal is produced which indicates that an obstruction is present, the door motor 60 will be reversed to as to reopen the door assembly. While one sensor 110,112 need be used, two are used in the embodiment illustrated in the event one of the sensors becomes inoperative. As illustrated in FIGS. 7–9, a tape-type electrical ribbon cable 93 is used to connect sensors 110,112 to the control circuit of FIG. 12 by connector 130. As shown in FIGS. 7–8, a pulley 89 is connected to a weight 91 for maintaining the ribbon cable 93 in a generally U-shaped configuration as the door panel 33 moves through its path.

According to the present invention, there is provided an autoloader door safety system which performs the following tasks:

A. Cut off the power to all the autoloader motors when any of the logic voltages (+5, +12, −12) have been interrupted.

B. Disable all unnecessary autoloader motors while the door is open.

C. In case of an obstruction, while the doors are being closed, override any control command and open the doors all the way, then give the control back to control.

D. In case of any damage to the door sensor cable and connector, open the doors all the way and keep them open until the problem is resolved.

Figure 11:
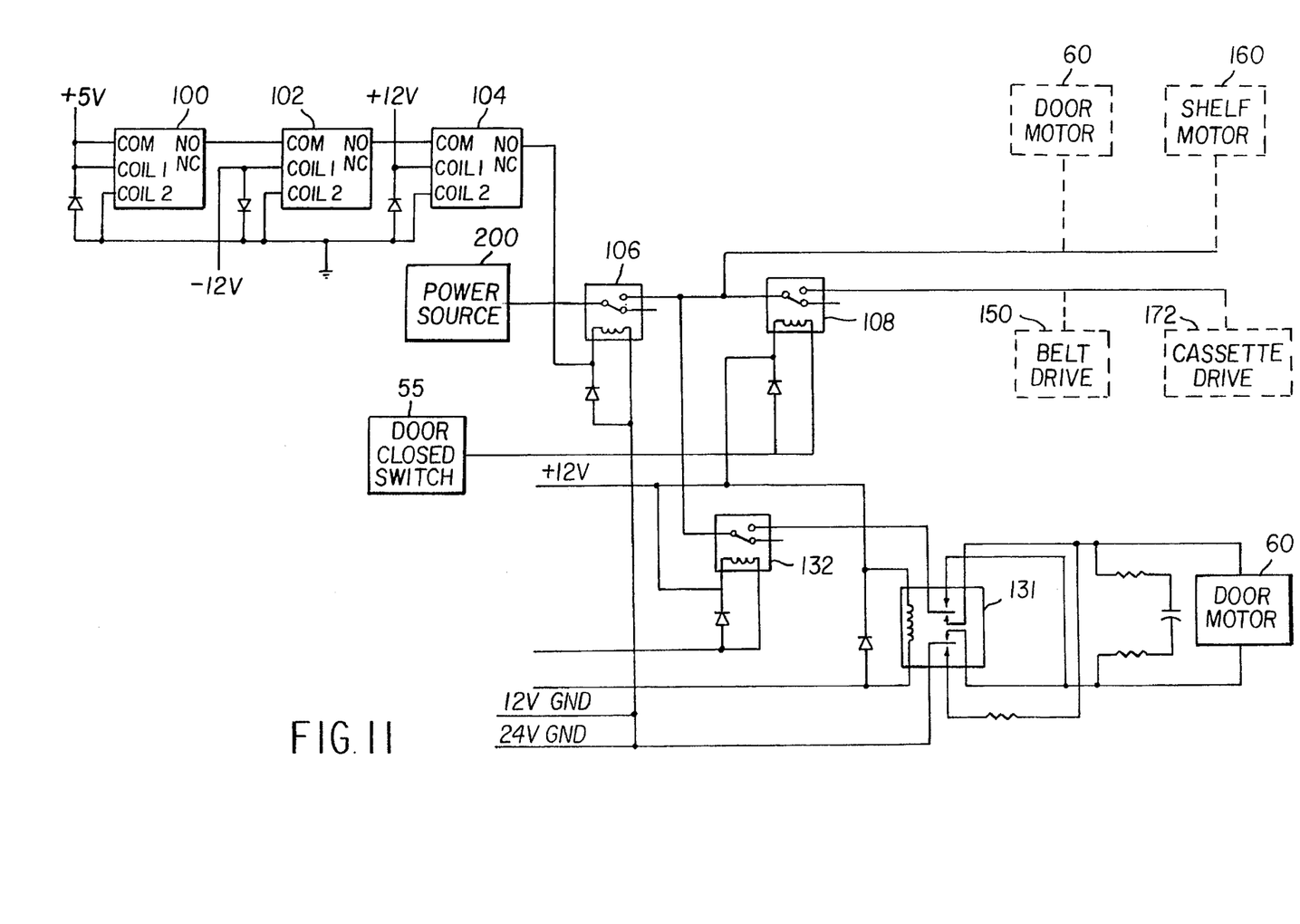
FIGS. 11 and 12 are schematic electrical diagrams showing an embodiment of door safety system according to the present invention.
Figure 12:
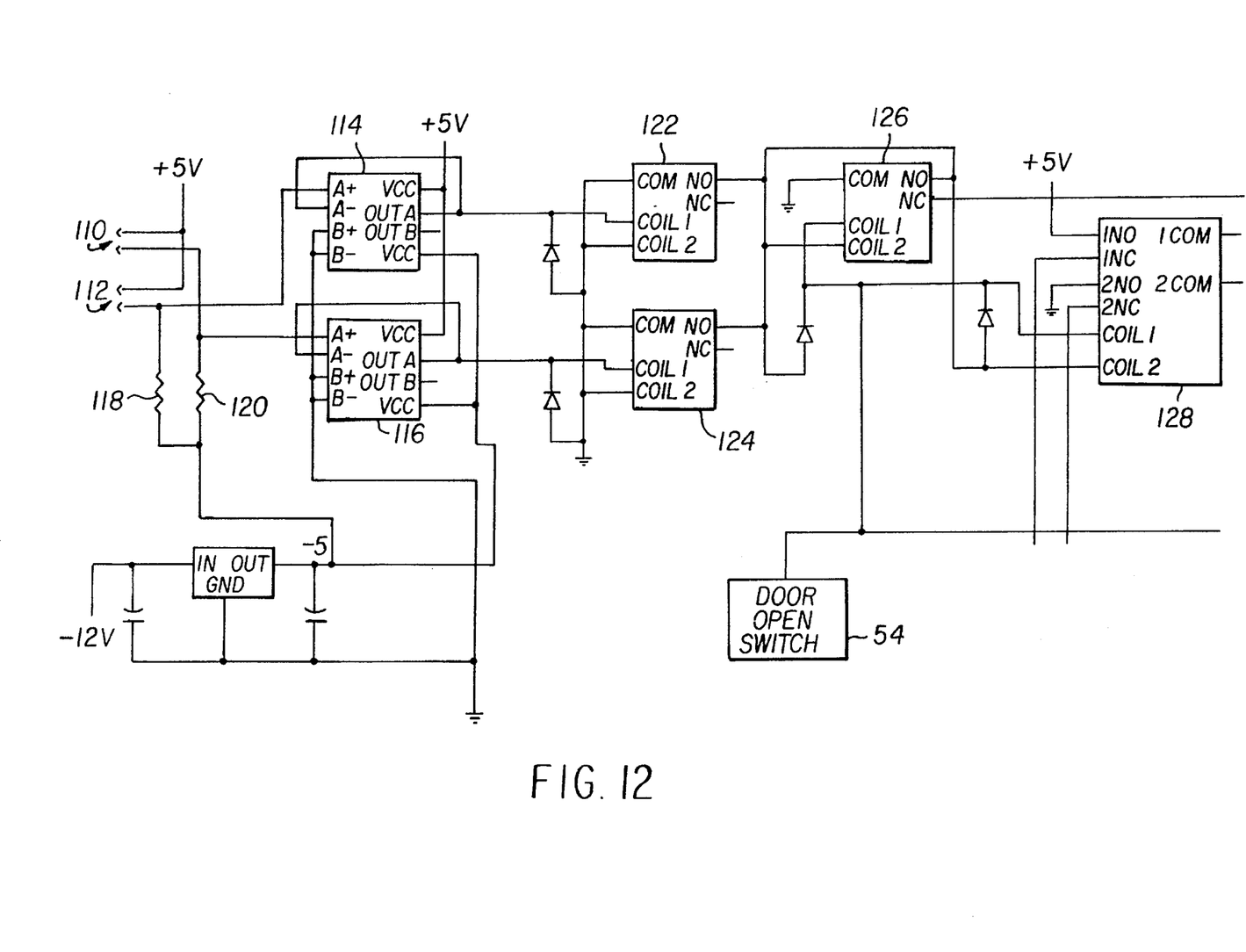

Implementation of these tasks will be described with reference to the schematic diagrams shown in FIGS. 11 and 12.

Task A

The door safety circuit has been designed to cut off the power to all the motors due to a power failure. This is implemented by a relay circuit which interrupts the 24 V line in case any of the control voltages are lost. The three printed circuit (PC) relays 100,102,104, detect +5 (Vec), −12, and +12, respectively. These relays are placed in series so that if any of the voltages drop to less than about 80% of its normal value, they signal a panel mount (PM) relay 106 to interrupt the 24 V line. All the relays that are used in this section are normally open.

Task B

The door safety circuit has been designed to ensure that while the doors 33,35 are open no unnecessary motor activity can be in progress. This is implemented by monitoring the top safety interlock switch 55 which is normally open while the doors 33,35 are not fully closed. When this switch 35 is open (floating), it deactivates a relay 108, that cuts powers from 24 V power source 200 to all of the motors except the door motor 60 and the shelf motor 160. When the doors 33,35 are fully closed, this switch 55 is made (GND) and the relay 108 is activated allowing the 24 V line to be present. This relay is also normally open.

Task C

Figures 13, 14:
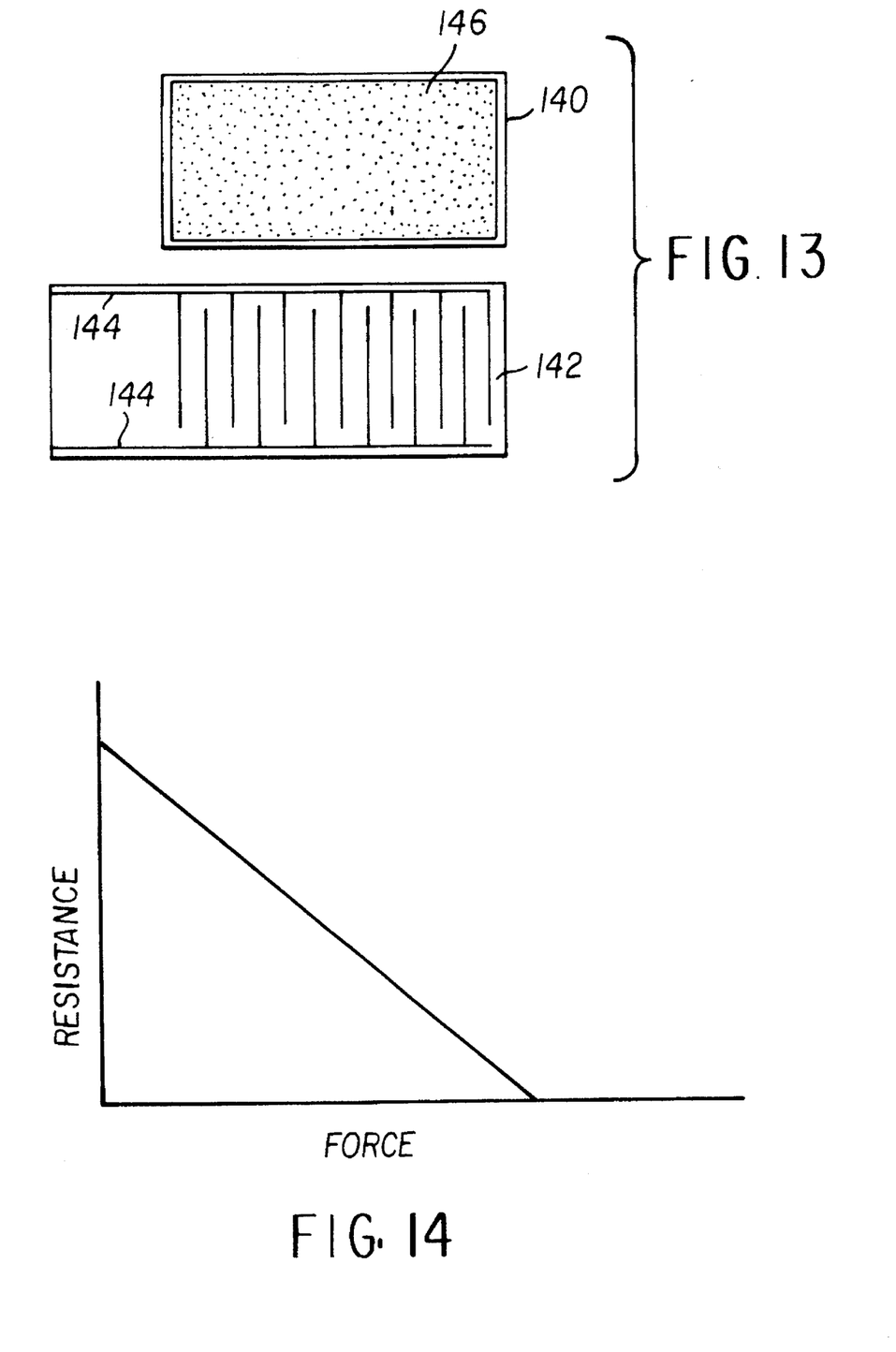
FIG. 13 is a diagrammatic view of a force sensitive resistor sensor for use in the present invention.
FIG. 14 is a graphical view of the force-resistance characteristic of the sensor of FIG. 13.

The door safety circuit has a pinch safety circuit that opens the doors 33,35 if they are obstructed at any time while they are being closed. The obstruction is detected by two Force Sensitive Resistor (FSR) sensors 110,112 supplied by Interlink Electronics (Santa Barbara, CA). A force sensitive resistor changes resistance inversely with applied force (FIG. 12). As shown in FIG. 13, the FSR includes two polymer films or sheets 140,142 forming a sandwich. A conducting pattern is deposited on the polymer sheet 142 in the form of a set of interdigiting electrodes 144. A semiconductive polymer 146 is deposited on the other sheet 140. The sheets 140,142 are faced together so that the conductive fingers 144 are shunted by the conducting polymer 146 when no force is applied to the sandwich, the resistance between the interdigiting electrodes 144 is quite high. With increasing force, such as when an obstruction is encountered, the resistance drops. This drop in resistance can be detected in a sensing circuit. Each FSR 110,112 has its own independent amplifier 114,116, respectively. Here the sensing circuit is duplicated to fulfill the safety requirements. One side of the FSR 110,112 is connected to +5, and the other side of the FSR 110,112 is connected to −5 V through a shunt resistor 118,120. The FSR 110,112 is made to have a resistance of approximately 100 KOhm when no pressure is applied to it and the resistance would drop to about 15 KOhm when the pressure is applied. The shunt resistor 118,120 is also about 100 KOhm. The voltage at the point where the FSR 110,112 and the shunt resistor 118,120 connect is being monitored. Under normal operation when the FSR 110,112 is not pinched, the voltage at this point is at about the ground potential. However, if the pressure is applied to the FSR 110,112 this voltage will rise to about 4 V. This voltage is buffered through a high current opamp 114,116 that drives a relay 122, 124. Any of these relays 122,124 will drive a latch relay 126. Here the condition is latched until a GND signal is received through the Door-Open switch 54 which is tripped when the doors 33,35 are fully open.

Hence, if an obstruction is detected, the direction of movement of doors 33,35 is reversed through the activation of relays 126, 128, 131, and 132.

Task D

An additional feature of the door safety circuit ensures that the FSR 110,112 and its cable 93 to the control circuit is intact. This is implemented by putting an upper limit on the resistance of the FSR 110,112 which is realized by placing a 100 KOhm resistor 118,120 in parallel with the FSR 110,112. This resistor 118,120 is built in to the FSR 110,112 at the time it is manufactured. Therefore it is possible to estimate the resistance of the FSR 110,112 when there is no pressure applied to it to about 100 KOhm. This will enable one to connect the other side of the 100 KOhm shunt resistor 118,120 to −5 V and the FSR 110,112 to +5 V and have their junction potential to be at about 0 V, when no pressure is applied. If the FSR cable 93, or its connector 130, is broken, the voltage at the junction of the shunt resistor 118,120 and the FSR 100,112 will drop to −5 V. This voltage, buffered as before, drives the appropriate relays which signal a door obstruction condition that forces the doors 33,35 to open and stay open until the problem with the cable 93 or the connector 130 is resolved.

Autoloader 10 includes a retractable table 34 (FIGS. 1 and 2), which can be moved by table drive 160 between an extended stacking position, as shown in FIG. 1 and a storage retracted position, inside body 14 as shown in FIG. 3. In the storage retracted position the retractable table 34 is disposed totally within the body 14 so that the door assembly 32 can be closed as shown in FIG. 3. Table 34 can be used to hold cassettes 20 and/or pallets 22 containing cassettes during loading and unloading. The details of the construction and operation of the retractable table 34 is described in greater detail in U.S. patent application Ser. No.981,219, filed Nov. 25, 1992, inventors John C. Boutet, Darryl D. DeWolff, James Lattimore, James J. Sheridan and Jeffrey J. Yaskow, entitled "Autoloader Having a Retractable Shelf", the contents of which are incorporated herein by reference. Alternatively, storage phosphor cassette 20 can be loaded or unloaded from a cart (not shown). Controls are provided to permit the operator to either open the door assembly 32 and have the table 34 extended automatically or to open only the door assembly 32 without extending the retractable table 34.

In the embodiment illustrated, the panels 33,35 are slideably mounted through the use of slide blocks which move in mating channels. However, other means may be employed for providing the sliding action to panels 33,35. For example, ball slides may be employed between the panels and frame of the autoloader.

Also in the embodiment illustrated, a chain is used to drive the panels up or down. Various other means may be used, such as timing belts with timing gears. Moreover, in lieu of a force sensitive resistor, parallel pressure plates can be used for faster response if an obstruction is sensed.

The present invention finds application in medical imaging systems and especially in a storage phosphor reader/ storage phosphor cassette autoloader system.

It is to be understood that various modifications and changes may be made without departing from the scope of the present invention, the present invention being limited by the following claims.

What is claimed is:

1. A storage phosphor cassette autoloader comprising:

first and second endless conveyor belts, said conveyor belts being spaced apart and having a plurality of outwardly extending shelves in vertical alignment so as to define a cassette read site and a plurality of cassette retaining sites;

a conveyor belt drive for driving said conveyor belts in unison to transfer cassettes loaded in said retaining sites serially through said read site;

a body encasing said conveyor belts and having a portal adjoining said cassette retaining sites for allowing cassettes to be placed on or removed from said shelves of said conveyor belts, a reader attached to said body and operatively connected to said read site to read the cassettes when located thereon;

at least one door assembly with a leading edge located adjacent to said portal for allowing access through said portal, and which is movably mounted on said body encasing for movement between a closed position and an open position;

means for moving cassettes through said portal into and out of said reader;

a door drive for moving said door assembly between the open and closed positions;

a force sensitive assembly mounted on said leading edge of said door assembly for sensing if said door assembly is obstructed while it is being closed;

a source of electrical power for supplying power to said conveyor belt drive and said door drive; and a safety control circuit connected to said source of electrical power for (a) cutting off all power from said source of power to said conveyor belt drive and said door drive when the power in a portion of said circuit fall below a predetermined level; (b) disabling the conveyor belt drive while said door is in the open position; and (c) controlling said door drive to move said door to said open position in response to said force sensitive assembly engaging an obstruction when said door is being closed.

2. The autoloader of claim 1 wherein said force sensitive assembly includes a force sensitive resistor, the resistance of which changes with an application of force.

3. The autoloader of claim 1 wherein said force sensitive assembly includes an electrical cable movable with said door and wherein said control causes said door to be moved to the open position and to remain in the open position, if said electrical cable is damaged.

4. The autoloader of claim 1 including a cassette advancing and retracting assembly and a cassette drive therefore, and wherein said control disables said cassette drive when said door is open or when there is an interruption of said source of electrical power.

5. The autoloader of claim 1 including a movable table for supporting cassettes and a table drive for extending and retracting said table and wherein said control disables said table drive when there is an interruption of said source of electrical power.

* * * * *